United States Patent [19]
Vaughan et al.

[11] 3,966,883
[45] June 29, 1976

[54] SYNTHETIC FERRIERITE SYNTHESIS

[75] Inventors: David Evan William Vaughan, Columbia; Grant Campbell Edwards, Silver Spring, both of Md.

[73] Assignee: W. R. Grace & Co., New York, N.Y.

[22] Filed: Oct. 16, 1974

[21] Appl. No.: 515,380

[52] U.S. Cl. .......................... 423/329; 252/455 Z; 423/328
[51] Int. Cl.$^2$......................................... C01B 33/28
[58] Field of Search ........... 423/328, 329, 330, 118; 253/455 Z

[56] References Cited
UNITED STATES PATENTS

| | | | |
|---|---|---|---|
| 3,411,874 | 11/1968 | Ciric | 423/328 |
| 3,436,174 | 4/1969 | Sand | 423/118 X |
| 3,692,475 | 9/1972 | Johnson | 423/329 |
| 3,760,062 | 9/1973 | Sand et al. | 423/329 |
| 3,808,326 | 4/1974 | McDaniel et al. | 423/329 |

OTHER PUBLICATIONS

Barrer et al., "Chemical Society Journal," 1964, part 1, pp. 485–497.
Zhdanov, "Molecular Sieve Zeolites–I," copyright 1971, American Chem. Soc., pp. 20, 21, 36 and 37.
Alietti et al., "The American Mineralogist," vol. 52, 1967, pp. 1562 and 1563.
Kerr, "Nature," vol. 210, Apr. 16, 1966, pp. 294 and 295.
Barrer et al., "The American Mineralogist," vol. 50, 1965, pp. 484–489.

*Primary Examiner*—Edward J. Meros
*Attorney, Agent, or Firm*—Joseph P. Nigon

[57] ABSTRACT

A process for preparing a synthetic ferrierite having the absorption and catalytic properties characteristic of 5 to 8 angstrom zeolites which comprises treating a reaction mixture consisting of strontium, calcium and/or sodium, lithium or magnesium salts, a source of silica and a source of alumina and water with natural or synthetic ferrierite seeds and heating to convert the mass to the synthetic ferrierite.

4 Claims, No Drawings

SYNTHETIC FERRIERITE SYNTHESIS

BACKGROUND OF THE INVENTION

This invention relates to the production of synthetic, crystalline ferrierite, an alumino-silicate zeolite. Ferrierite is relatively scarce in nature but does occur in bedded deposits in the Western United States. Natural ferrierite has the general formula $(Na,K)_{0.5-4}$ $Ca_{0-1}$ $Mg_{0.5-3}$ $(Al_{4-7}$ $Fe_{0-1}$ $Si_{27-31'})$ $O_{72}$. $18-23$ $H_2O$ where the sum of the moles of alkali and alkaline earth oxides equal the sum of the moles of alumina and ferria, $\Sigma(Na_2O + K_2O + CaO + MgO) \cong \Sigma(Al_2O_3 + Fe_2O_3)$, and $\Sigma(Si + Al + Fe) = 36$. Natural ferrierite from Kamloops Lake, British Columbia, Canada has been shown by P. A. Vaughan, Acta Crystallographica 21, 983 (1966), to be orthorhombic with the space group I 2/M 2/M 2/M. Natural ferrierites from various localities do not have exactly the same X-ray powder pattern, but the X-ray powder pattern of ferrierite from each locality fits the theoretically allowed lines for the space group 2/M, 2/M, 2/M, as shown below in Table A. Synthetic strontium ferrierites of the approximate composition $SrO:Al_2O_3$: 7-9 $SiO_2$, the X-ray powder patterns of which also fit the allowed lines, have been described in the literature by R. M. Barrer and D. J. Marshall, Journal of the Chemical Society 1964. 485. Synthetic strontium and calcium ferrierite were made at 350°–370°C and 1,020–1,632 atmospheres by D. B. Hawkins, Materials Research Bulletin, 2 951 (1967). Also, synthetic sodium ferrierite was made by E. E. Senderov, Geochemistry (English Translation) 9. 848 (1963). Synthesis of strontium ferrierites by Barrer and Marshall were carried out at temperatures of 260°, 340° and 380°C at pressures of 39, 144 and 235 atmospheres, respectively. Even though such high temperatures as 340° and 380° were employed, the synthesis of strontium ferrierite required 2–4 days. Twenty days were required to crystallize strontium ferrierite from a 1.5 $SrO:1.0$ $Al_2O_3$: $9SiO_2$: $500H_2O$ slurry at 260°C.

The synthesis of strontium ferrierite, reported by Barrer and Marshall, at 340° and 380° C are relatively difficult, and the product ferrierite is frequently contaminated with impurities. By using the seeding technique, described below, we have reduced the temperatures, pressures and times required for synthesis; also we have greatly improved the reliability of the process.

Furthermore, no natural ferrierite has been shown to contain substantial amounts of strontium or lithium or both. Table B shows that samples of natural ferrierite from five localities are mainly sodium, potassium, magnesium, calcium aluminosilicate hydrates, with some substitution of iron for aluminum.

TABLE A

COMPARISON OF D SPACINGS OF TWO NATURAL AND SYNTHETIC STRONITIUM FERRIERITES WITH THE ALLOWED LINES

| FERRIERITE Theoretical for I 2/M 2/M 2/M Where a = 19.16 b = 14.13 and c = 7.49 | | Ferrierite Kamloops Lake B.C., Canada | | FERRIERITE, Agoura, Ca. | | SYNTHETIC STRONTIUM FERRIERITE* | |
|---|---|---|---|---|---|---|---|
| hkl | dA | dA | Relative Intensity | dA | Relative Intensity | dA | Relative Intensity |
| 110 | 11.37 | 11.3 | 20 | 11.3 | 3 | — | — |
| 200 | 9.58 | 9.61 | 100 | 9.47 | 50 | 9.49 | 75 |
| 020 | 7.06 | } 7.00 | 30 { | 7.07 | 38 } | 7.07 | 20 |
| 101 | 6.98 | | | — | — | 6.96 | 15 |
| 011 | 6.62 | 6.61 | 20 | 6.59 | 3 | 6.61 | 55 |
| 310 | 5.82 | 5.84 | 50 | 5.75 | 15 | 5.77 | 15 |
| 220 | 5.69 | — | — | 5.64 | 14 | — | — |
| 211 | 5.44 | — | — | — | — | 5.43 | 5 |
| 121 | 4.964 | 4.96 | 10– | — | — | 4.96 | 15 |
| 301 | 4.860 | — | — | — | — | — | — |
| 400 | 4.790 | 4.80 | 10– | 4.75 | 2 | 4.76 | 15 |
| 130 | 4.574 | 4.58 | 10– | 4.56 | 1 | — | — |
| 321 | 4.004 | — | — | — | — | — | — |
| 031 | 3.987 | 3.99 | 90 | 3.98 | 35 | 3.99 | 45 |
| 420 | 3.965 | — | — | 3.94 | 35 | 3.94 | 35 |
| 411 | 3.880 | 3.88 | 10 | — | — | 3.86 | 25 |
| 330 | 3.791 | 3.791 | 20 | 3.78 | 65 | 3.78 | 50 |
| 002 | 3.745 | — | — | — | — | 3.74 | 10 |
| 510 | 3.698 | 3.69 | 50 | 3.66 | 12 | } 3.67 | 30 |
| 231 | 3.681 | — | — | — | — | | |
| 112 | 3.557 | 3.54 | 80 | — | — | 3.555 | 10 |
| 040 | 3.532 | — | — | 3.54 | 100 | 3.536 | 90 |
| 202 | 3.488 | 3.49 | 80 | 3.48 | 18 | 3.483 | 100 |
| 501 | 3.411 | 3.42 | 20 | — | — | 3.389 | 15 |
| 240 | 3.314 | 3.31 | 20 | 3.31 | 35 | 3.313 | 20 |
| 600 | 3.193 | 3.20 | 10 | — | — | — | — |
| 141 | 3.152 | 3.15 | 30 | — | — | 3.142 | 55 |
| 312 | 3.149 | — | — | 3.14 | 12 | — | — |
| 521 | 3.072 | 3.07 | 30 | — | — | 3.058 | 45 |
| 431 | 3.064 | — | — | 3.05 | 12 | — | — |
| 530 | 2.972 | 2.97 | 30 | — | — | 2.960 | 25 |
| 402 | 2.950 | — | — | 2.945 | 11 | 2.938 | 25 |
| 620 | 2.910 | 2.90 | 20 | — | — | 2.897 | 35 |
| 422 | 2.722 | 2.72 | 20 | — | — | 2.715 | 30 |
| 051 | 2.644 | 2.64 | 20 | 2.644 | 7 | 2.646 | 15 |
| 350 | 2.584 | 2.58 | 30 | 2.582 | 10 | 2.583 | 10 |
| 701 | 2.571 | — | — | — | — | — | — |

*Barrier and Marshall, American Mineralogist 50, 484 (1965)

TABLE B

| Locality<br>Oxide | Itomuka,<br>Japan<br>Yajima,<br>et al. (1971) | Chemical Analysis of Natural Ferrierite* | | | | |
|---|---|---|---|---|---|---|
| | | Kamloops<br>Lake,<br>Graham<br>(1918) | Albero<br>Bassi,<br>Alietti<br>(1967) | Agoura,<br>Calif. | Agoura,<br>Calif. | Sonora Pass,**<br>Calif. |
| $SiO_2$ | 71.21 | 69.13 | 56.80 | 74.40 | 75.64 | 66.17 |
| $Al_2O_3$ | 9.84 | 11.44 | 12.71 | 8.51 | 9.39 | 10.71 |
| $Fe_2O_3$ | 0.05 | | 3.29 | 0.04 | 0.01 | 0.99 |
| $TiO_2$ | — | | 0.10 | | | |
| MnO | — | | | | | |
| CaO | — | none | 5.52 | 0.13 | 0.14 | 0.55 |
| MgO | 1.70 | 2.92 | 4.12 | 1.07 | 1.02 | 2.79 |
| $Na_2O$ | 1.59 | 3.97 | 0.27 | 1.91 | 2.33 | |
| $K_2O$ | 2.85 | 0.36 | 0.82 | 2.48 | 2.80 | 1.54 |
| $CO_2$ | — | | 2.84 | | | |
| $H_2O(+)$ | 4.25 } | 13.05 | 4.16 } | 11.46 | 8.67 | 17.25 |
| $H_2O(-)$ | 8.63 } | | 10.16 } | | | |
| | 100.12 | 100.87 | 100.79 | 100 | 100 | 100 |

Chemical Formulae of Ferrierite $(Na_{1.32}K_{1.57})Mg_{1.09}(Si_{30.95}Al_{5.03}Fe_{0.01})_{35.99}O_{72.01} \cdot 18.82H_2O$ (Yajima, et al.)
$(Na,K)_4Mg_2(Si_{30}Al_6)O_{72}(OH)_2 \cdot 18H_2O$ (Staples, 1955)
$Na_{1.5}Mg_2Si_{30.5}Al_{5.5}O_{72} \cdot 18H_2O$ (Vaughan, 1966)
$K_{0.51}Na_{0.25}Ca_{0.99}Mg_{2.98}(Fe_{1.20}Al_{7.25}Si_{27.50})O_{72} \cdot 23.12H_2O$ (Alietti, 1967)
$Na_{1.8}K_{1.4}Mg_{0.6}(Si_{31.6}Al_{4.4})O_{72} \cdot 18H_2O$ (Wise et al., 1969)

*From S. Yajima, et al., Mineralogical Journal, 6 343 (1971).
**W. S. Wise, et al., American Mineralogist, 54, 887 (1969).

BRIEF DESCRIPTION OF THE INVENTION

We have found that synthetic ferrierite can be prepared having the X-ray diffraction pattern shown in Table C from a reaction mixture that contains strontium hydroxide, calcium hydroxide, magnesium hydroxide, lithium hydroxide, sodium hydroxide, a source of alumina, a source of silica, water, and natural or synthetic ferrierite as seeds. The synthetic strontium, calcium, sodium ferrierite can be made from a slurry composed of strontium hydroxide, sodium hydroxide, calcium hydroxide, a source of silica, a source of alumina and water. The strontium ferrierite can be obtained from a mixture of strontium hydroxide, alumina, silica and water. The strontium-sodium ferrierite can be prepared from a mixture of strontium hydroxide, sodium hydroxide, a source of alumina, a source of silica and water. The strontium-lithium ferrierite can be prepared from a mixture of strontium hydroxide, lithium hydroxide, a source of alumina, a source of silica, and water. The lithium ferrierite can be prepared from a mixture of lithium hydroxide, a source of alumina, a source of silica and water. The essential feature of the process is the use of an amount equal to 0.1 to 10 percent of the reaction mixture of a powdered natural ferrierite or a powdered synthetic ferrierite recovered from previous reactions.

We have further discovered that good synthetic ferrierite can be made from natural amorphous volcanic ash, both with and without seeds of natural ferrierite.

The reactions are carried out at a temperature of 90° to 325°C. in enclosed vessels at a pressure of 1 to 120 atmospheres.

It is an object of this invention to prepare a highly siliceous, acid resistant zeolite for sorption and catalysis uses, especially in the presence of dilute acids.

DETAILED DESCRIPTION OF THE INVENTION

The first step of the process is the preparation of the precursor mixture. The particular mixture used, of course, depends on the desired composition of the product. The strontium, magnesium, calcium, sodium or lithium salts may be added as the hydroxides of these salts. The hydroxides are preferred since it is essential that the reaction be carried out in an alkaline medium, preferably at a pH of about 8 to 14.

The alumina can be added in any hydrated or amorphous form. Alpha-alumina monohydrate and bauxite give satisfactory results, in addition to commercially available alumina sols.

The silica can be added in any form that is finely divided. The silica sols give satisfactory results as do silica gel powders, such as Hi-Sil 215 (a product of PPG Chemicals). Part of the silica and all of the sodium may be added as sodium silicate if the final product is to be a sodium containing ferrierite. Also, both the silica and the alumina may be supplied by pumice or tuff, natural amorphous alumino silicates.

The ratios of reactants depends, of course, on the final composition of the mixture. When the product to be recovered is a strontium calcium ferrierite the reactant mixture should have the following ratio of reactants: 1.5–0.5 SrO: 0.1–1.0CaO: $Al_2O_3$: 6–30$SiO_2$: 50–600$H_2O$. When the ferrierite is a strontium ferrierite the oxide ratio of reactants is 0.75–1.5SrO: $Al_2O_3$: 7–20$SiO_2$: 50–600$H_2O$. When the ferrierite is in the strontium-sodium form the reactant mixture contains the following ratios of reactants: 1.25 –0.75SrO: 0–0.25 $Na_2O$: $Al_2O_3$: 6–30$SiO_2$; 50–600$H_2O$.

The ratio of reactants in the reactant mixture used to prepare the strontium-calcium-sodium-ferrierite is 0.75–0.50 SrO: .250–.125CaO: .250–.125$Na_2O$: $Al_2O_3$: 6–30 $SiO_2$: 50–600 $H_2O$.

The ferrierite seeds are usually in a fine powder, preferably about minus 200 mesh. The seeds may be the natural ferrierite mineral, or they may be derived from any portion of a prior preparation. A sample of the natural ferrierite used as seeds from Lovelock, Neveda had the following composition in weight percent:

| | |
|---|---|
| CaO | 1.7 |
| MgO | 1.1 |
| $Fe_2O_3$ | 1.4 |
| $TiO_2$ | 0.1 |

-continued

| | |
|---|---|
| K$_2$O | 4.5 |
| Na$_2$O | 0.7 |
| Al$_2$O$_3$ | 10.9 |
| SiO$_2$ | 79.6 |

In the preparation the components of the reaction mixture are added in the desired ratio of reactants and the reactants are transferred to a sealed pressure reaction vessel. The temperature is increased to about 180° to 325°C. and the reaction allowed to proceed at autogenous pressure. The synthesis is normally completed in about 1 to 7 days at 300°C., when the strontium is in the sole alkaline earth component. At 250°C. the synthesis takes two days. However, when the alkali metal component is a mixture of strontium and lithium, lithium and sodium, strontium and sodium or lithium, the reaction is completed in a period as little as 24 hours at 225°C. Thus, the reaction time is from about 1 to 7 days with about 1–2 days being preferred in most cases.

The other steps in the preparation are conventional. The product is removed from the reaction vessel and washed free of excess reactants and dried. The washing is preferably carried out with deionized water at a temperature of about 20° to 80°C. Drying is immediately carried out at a temperature of about 105°C. for a period of about 1 hour.

Our invention is illustrated by the following specific but nonlimiting examples.

EXAMPLE 1

A quantity of naturally occuring ferrierite from a deposit in Lovelock, Nevada, was ground into a powder and 17 g. of the powder that passed through 325 mesh sieve having a particle size of about 20 to about 42 microns was added to a mixture containing 146 g. of strontium hydroxide octahydrate, 636 g. of a commercially available silica sol sold under the trade name of Ludox HS-40, 213 g of alumina sol sold under the trade name of Frictionize alumina sol and 358 g of water.

The components were blended in a Hobart mixer until a soft, uniform paste was formed. A portion of the paste was then placed in steel reaction vessels. The vessel was sealed and placed in an oven and maintained at 300° ± 5°C. The reactant slurry had the following molar ratio of reactants: 1 SrO:1 Al$_2$O$_3$: 10 SiO$_2$: 125 H$_2$O. The 17 g. of ferierite powder supplies 3% of the slurry alumina and the alumina sol supplies 97% of the slurry alumina. After 24 hours at 300°C. the reaction vessel was removed from the oven, cooled and opened. The product, a white slurry, was washed free of excess alkalinity with hot deionized water and oven dried at 105°C. The dried powder was X-rayed by the powder diffraction method using copper radiation. The X-ray powder showed the product to be high purity ferrierite having an X-ray powder pattern shown in Table C. The product recovered after 24 hours had the following chemical analysis in weight percent after calcination.

| | |
|---|---|
| SrO | 16.0 |
| K$_2$O | 0.1 |
| Al$_2$O$_3$ | 11.4 |
| SiO$_2$ | 72.5 |

The product recovered after ten days reaction had the following analysis in weight percent after calcination.

| | |
|---|---|
| SrO | 15.5 |
| K$_2$O | 0.1 |
| Al$_2$O$_3$ | 12.0 |
| SiO$_2$ | 72.4 |

The X-ray powder patterns of the 1 day and the ten day ferrierite products were virtually identical with no impurities of other crystalline products.

EXAMPLE 2

This example illustrates another method of preparing the synthetic ferrierite. A total of 17 g. of the natural ferrierite powder was added to 358 g. of water and the mixture ball milled for two hours and 146 g. of strontium hydroxide octahydrate, 636 g. of silica sol and 213 g. of alumina sol were added. The components were blended as in Example 1 and placed in steel reaction vessels. The vessels were sealed and heated 300°C. for 2 days. The product recovered was washed with warm water and dried. The X-ray powder diffraction pattern of the product is essentially the same as shown in Table C.

EXAMPLE 3

This example illustrates that a synthetic strontium ferrierite can itself serve to seed the synthesis of synthetic ferrierite.

A slurry having the oxide ratios of 1 SrO:Al$_2$O$_3$: 10SiO$_2$; 125H$_2$O was prepared using the same reagents as in Example 1, except that ferrierite seeds were 17 g. of the strontium ferrierite, instead of natural ferrierite, recovered as a product in Example 1. The slurry was placed in a sealed vessel and heated at 300°C. for 2 days. The product was shown to have the same X-ray diffraction pattern as the product of Example 1.

EXAMPLE 4

This example illustrates that the reaction will go to completion at temperatures below 250°C.

A reaction slurry was prepared from 17 g. of natural ferrierite powder that had been ball milled in 350 g. of water for 2 hours and 146 g. of strontium hydroxide octahydrate, 636 g. of silica sol and 213 g. of alumina sol were added. The components were blended until a soft uniform paste was formed. A portion of this paste was placed in a steel reactor and heated to a temperature of 190°C. for 23 days. At the end of this time the reaction vessel was opened. The product was filtered, washed with hot deionized water and dried at 105°C. The X-ray diffraction pattern of the product was the same as the ferrierite pattern set out in Table C.

EXAMPLE 5

This example illustrates the preparation of a strontia calcia ferrierite. The use of inexpensive calcium hydroxide reduces the cost of the raw materials.

The slurry was prepared from 14 g. of calcium hydroxide, 51 g. of strontium hydroxide octahydrate, 445 g. of silica sol 149 g. of alumina sol, 12 g. of ferrierite powder and 279 g. of water. The ratio of reactants in the slurry was 0.5 SrO:0.5 CaO: Al$_2$O$_3$:10 SiO$_2$: 125H$_2$O. The slurry was placed in a pressure vessel, sealed and heated at 300°C. for three days. The product was recovered, washed with hot deionized water, dried and the X-ray diffraction pattern was determined.

The product was shown to be ferrierite. The chemical analysis of the product was as follows:

| | |
|---|---|
| SrO | 8.5 |
| CaO | 4.1 |
| $K_2O$ | 0.1 |
| $Al_2O_3$ | 11.5 |
| $SiO_2$ | 75.8 |

EXAMPLE 6

An effort was made to determine whether a suitable product would be prepared if a smaller amount of a natural ferrierite was added to seed the synthesis slurry.

A slurry having the oxide ratio of SrO:1 $Al_2O_3$: 10 $SiO_2$:125 $H_2O$ was prepared by mixing 8.5 g. of natural ferrierite having a particle size of about 20–42 microns, 146 g. of strontium hydroxide octahydrate, 648 g. of silica sol, and 219 g. of alumina sol and 347 g. of water. In this reaction mixture the natural ferrierite powder supplied 1.5% of the alumina and the alumina sol supplied 98.5%. The resulting slurry was placed in a pressure vessel, sealed and heated to 300°C in an oven. After 24 hours of heating the reactor was removed from the oven, cooled and the slurry filtered, washed and dried at 105°C. The X-ray powder diffraction showed the product to be ferrierite.

EXAMPLE 7

A slurry of the same composition as Example 1 was made up, placed in the steel reaction vessel and the vessel sealed and heated at 250°± 5°C for two days. The product was recovered, washed, dried and submitted for X-ray diffraction. The product was found to be ferrierite.

EXAMPLE 8

A slurry of the same composition as Example 7 was prepared and placed in a steel reaction vessel, sealed and heated at 250°C± 5°C for two days. The product was washed, dried and submitted for X-ray analysis. The X-ray diffraction pattern was the same as in Table C.

EXAMPLE 9

The addition of 0.25 mole $Na_2O$ and the reduction of SrO from 1.0 mole to 0.75 mole reduces the reaction time to one day when the reaction temperature is 250°C.

TABLE C

X-Ray Powder Patterns of Synthetic Ferrierites

| Example No. | 1 | | 20 | | 22 | | 25 | |
|---|---|---|---|---|---|---|---|---|
| Type of Ferrierite | Strontium | | Strontium - Lithium | | Lithium | | Strontium, Potassium, Sodium | |
| hkl | dA | I | dA | I | dA | I | dA | I |
| 200 | 9.50 | 47 | 9.50 | 49 | 9.50 | 81 | 9.50 | 53 |
| 020 | 7.02 | 14 | 7.08 | 17 | 7.02 | 31 | 7.08 | 23 |
| 101 | 6.91 | 14 | 6.91 | 12 | 6.91 | 26 | 6.96 | 13 |
| 011 | 6.60 | 39 | 6.60 | 30 | 6.60 | 23 | 6.60 | 22 |
| 310 | 5.79 | 10 | 5.79 | 11 | 5.79 | 11 | 5.79 | 13 |
| 220 | 5.68 | 8 | 5.71 | 8 | 5.68 | 8 | 5.68 | 10 |
| 211 | 5.37 | 5 | 5.40 | 4 | 5.43 | 1 | 5.43 | 2 |
| 121 | {4.95 | 8} | {4.95 | 5} | 5.01 | 3 | 4.98 | 2 |
| 301 | | | | | 4.87 | 4 | 4.84 | 2 |
| 400 | 4.76 | 5 | 4.77 | 3 | 4.77 | 3 | 4.77 | 2 |
| 130 | 4.52 | 3 | 4.52 | 2 | 4.50 | 8 | — | — |
| 321 | 3.98 | 46 | 3.98 | 59 | 4.00 | 59 | 3.98 | 44 |
| 420 | 3.95 | 25 | 3.95 | 30 | 3.96 | 42 | 3.93 | 31 |
| 411 | 3.91 | 24 | 3.88 | 24 | 3.85 | 23 | 3.85 | 18 |
| 330 | 3.78 | 39 | 3.78 | 46 | 3.78 | 51 | 3.77 | 48 |
| 002 | 3.73 | 8 | — | — | 3.73 | 23 | 3.73 | 14 |
| 510,231 | 3.67 | 27 | 3.66 | 27 | 3.67 | 23 | 3.66 | 24 |
| 112 | 3.57 | 10 | — | — | 3.59 | 4 | 3.59 | 6 |
| 040 | 3.53 | 97 | 3.53 | 100 | 3.56 | 100 | 3.54 | 100 |
| 202 | 3.48 | 100 | 3.46 | 91 | 3.49 | 86 | 3.49 | 88 |
| 501 | 3.38 | 10 | 3.37 | 16 | 3.38 | 15 | 3.38 | 5 |
| 240,022 | 3.31 | 12 | 3.30 | 22 | 3.32 | 16 | 3.31 | 5 |
| 141 | 3.14 | 39 | 3.13 | 41 | 3.14 | 39 | 3.14 | 39 |
| 521,431 | 3.06 | 34 | 3.04 | 39 | 3.06 | 19 | 3.06 | 23 |
| 530 | {2.95 | 10} | {2.94 | 17} | 2.98 | 12 | 2.95 | 13 |
| 402 | | | | | 2.96 | 12 | 2.93 | 11 |
| 620 | 2.90 | 10 | 2.89 | 20 | 2.89 | 14 | 2.89 | 20 |
| 422 | 2.72 | 19 | 2.70 | 15 | 2.72 | 11 | 2.71 | 11 |
| 051 | 2.64 | 15 | 2.64 | 15 | 2.65 | 4 | 2.65 | 6 |
| 350 | 2.59 | 5 | 2.58 | 5 | 2.58 | 7 | 2.58 | 7 |

It is obvious from the data above that the various cation forms of synthetic ferrierite, prepared by our process, have very similar X-ray powder patterns.

A slurry was prepared from 11 grams of sodium hydroxide, 110 grams of strontium hydroxide octahydrate, 17 grams of powdered natural ferrierite, 636 grams of silica sol, 213 grams of alumina sol with 380 ml of water. The reactant mixture had the following ratio of reactants 0.75 SrO;0.25 $Na_2O$:$Al_2O_3$: 10 $SiO_2$: 125 $H_2O$. A portion of the slurry was placed in a steel reaction vessel, and the vessel was sealed and heated for 24 hours at 250°C. The product was removed from the reaction vessel, washed and oven dried at 105°C. The X-ray powder pattern showed the product to be ferrierite.

EXAMPLE 10

The importance of the ferrierite seeds was demonstrated in a run in which no seeds were added to the reaction mixture.

A slurry having the ratio of reactants SrO:$Al_2O_3$: 10 $SiO_2$: 125 $H_2O$ was prepared from 146 g. strontium hydroxide octahydrate, 661 g. of silica sol, 224 g. of alumina sol, and 337 g. of water. The slurry was placed in a steel reaction vessel, heated at 300°C for a period of 7 days. The product was removed and submitted for X-ray analysis. The product was amorphous to X-rays and contained no crystalline compounds.

EXAMPLE 11

A reaction mixture was prepared to contain 73 g. strontium hydroxide $Sr(OH)_2 \cdot 8 H_2O$, 8.5 grams of −325 mesh powdered natural ferrierite, 483 grams of a silica sol, 101 grams of alumina sol and 718 ml of water. The ratio of reactants was $1.0 SrO:1.0 Al_2O_3:12 SiO_2:200 H_2O$. A portion of this slurry was heated in a steel reaction vessel at 250° ± 5°C for seven days. The product recovered was strontium ferrierite. The chemical analysis of the product in weight percent was as follows:

| | |
|---|---|
| SrO | 11.4 |
| $K_2O$ | 0.1 |
| $Al_2O_3$ | 8.2 |
| $SiO_2$ | 80.3 |

EXAMPLE 12

A slurry was made up using the same reagents as in Example 1 except that the natural ferrierite was added as a −200 mesh powder. Strontium ferrierite was found as the product after heating the slurry at 300°C for one day in a steel reaction vessel. The strontium ferrierite recovered had the X-ray diffraction pattern shown in Table C.

EXAMPLE 13

A slurry similar to one described in Example 10 was prepared by using 17 grams of −325 mesh powdered natural ferrierite as seeds. The reaction slurry contained 17 grams of the ferrierite seeds, 128 grams of strontium hydroxide octahydrate, 6 grams of sodium hydroxide, 636 grams of silica sol, 214 grams of alumina sol, and 369 ml. of water. The slurry oxide ratio was $0.875 SrO: 0.125 Na_2O:Al_2O_3:10 SiO_2:125 H_2O$. The slurry was heated in a steel reaction vessel at 250°C. After one day the ferrierite product having the X-ray diffraction pattern shown in Table C was recovered. The chemical analysis of the product in weight percent was:

| | |
|---|---|
| SrO | 15.4 |
| $K_2O$ | 0.2 |
| $Na_2O$ | 2.3 |
| $Al_2O_3$ | 11.1 |
| $SiO_2$ | 73.0 |

EXAMPLE 14

A slurry with the oxide ratios $0.5 SrO:0.25 Na_2O:0.25 CaO:Al_2O_3:10 SiO_2:125 H_2O$ was prepared by mixing 73 grams of strontium hydroxide octahydrate, 10 grams of calcium hydroxide, 213 grams of alumina sol, 636 grams of silica sol, 11 grams of sodium hydroxide and 17 grams of powdered natural ferrierite in 400 ml of water. The slurry was heated for one day in a steel reaction vessel at 250° ± 5°C. The product was a strontium calcium sodium ferrierite; analysis of the product showed the chemical composition in weight percent to be:

| | |
|---|---|
| SrO | 8.2 |
| $Na_2O$ | 2.7 |
| $K_2O$ | 0.2 |
| CaO | 2.4 |
| $Al_2O_3$ | 11.9 |
| $SiO_2$ | 74.5 |

The use of relatively inexpensive sodium and calcium hydroxides reduces the cost of the raw materials.

EXAMPLE 15

This example demonstrates that alumina hydrate powder can be substituted form for the alumina sol. The use as alumina hydrate powder is less expensive than the use of alumina sol.

A slurry having the oxide reactant ratios of $0.75 SrO:0.25 Na_2O:Al_2O_3:8 SiO_2:100 H_2O$ was made up from 45 grams of an alpha alumina monohydrate powder, 71 grams of strontium hydroxide octahydrate, 7 grams of sodium hydroxide, 411 grams silica sol, and 11 grams of −325 mesh powdered natural ferrierite in 300 ml. of water. The slurry was reacted in a steel reaction vessel at 250°C ± 5°C. for three days. The product recovered was ferrierite having the X-ray powder diffraction shown in Table C. The chemical analysis of the product in weight percent was:

| | |
|---|---|
| SrO | 11.7 |
| $Na_2O$ | 2.2 |
| $Al_2O_3$ | 16.2 |
| $SiO_2$ | 70.5 |
| $K_2O$ | 0.1 |

EXAMPLE 16

In this example both alumina hydrate powder and silica gel powder were substituted for the alumina and silica sols. This greatly reduces the cost of the raw materials.

A slurry was prepared by mixing 45 grams of alpha alumina monohydrate powder, 183 grams of a silica gel powder, 71 grams of strontium hydroxide octahydrate, 7 grams of sodium hydroxide, 11 grams of powdered natural ferrierite (−325 mesh) in 567 ml. of water. The slurry was reacted for four days at 250°C., the product was analyzed and found to have the X-ray diffraction pattern of ferrierite as shown in Table C. The chemical analysis of the product in weight percent was:

| | |
|---|---|
| SrO | 11.2 |
| $Na_2O$ | 2.0 |
| $K_2O$ | 0.1 |
| $Al_2O_3$ | 16.2 |
| $SiO_2$ | 70.5 |

EXAMPLE 17

A slurry having the oxide ratio of reactants of $0.5 SrO:0.25 MgO:0.25 Na_2O:Al_2O_3:10 SiO_2:125 H_2O$ was prepared by mixing 43 g. of strontium hydroxide octahydrate, 3.2 g. of magnesium oxide, 6.5 grams of sodium hydroxide, 10 grams of powdered natural ferrierite, 125 grams of alumina sol and 374 grams of silica sol in 235 ml of water. This slurry was placed in steel reaction vessels and the vessels are sealed. They were then heated in an oven to 250°C. After two days the reaction product was ferrierite as shown by the X-ray powder pattern. The chemical analysis of the product in weight percent was:

| | |
|---|---|
| SrO | 8.1 |
| MgO | 1.2 |
| $Na_2O$ | 2.4 |
| $K_2O$ | 0.1 |
| $Al_2O_3$ | 11.5 |
| $SiO_2$ | 76.0 |

EXAMPLE 18

Ferrierite was synthesized from a reaction slurry having the ratios of reactants 0.375 SrO:0.375 CaO:0.25 $Na_2O$:$Al_2O_3$:10 $SiO_2$:125 $H_2O$. The slurry was prepared from 32 grams of strontium hydroxide octahydrate, 9 grams of calcium hydroxide, 6.5 grams of sodium hydroxide, 10 grams of natural powdered ferrierite, 125 grams alumina sol, and 374 grams silica sol in 241 ml of water. The slurry was heated in a sealed steel reaction vessel for two days at 250 ± 5°C. The crystallized zeolite recovered was shown to be ferrierite by its X-ray powder pattern. The analysis of the product in weight percent was:

| | |
|---|---|
| SrO | 7.1 |
| CaO | 1.8 |
| $Na_2O$ | 3.2 |
| $K_2O$ | 0.1 |
| $Al_2O_3$ | 12.2 |
| $SiO_2$ | 75.6 |

EXAMPLE 19

A slurry of the oxide ratio 0.5 SrO:0.5 $Li_2O$:1 $Al_2O_3$: 10 $SiO_2$: 125 $H_2O$ was prepared by blending 51 g. $Sr(OH)_2.8H_2O$, 16 g. $LiOH.H_2O$, 149 g. alumina sol, 445 g. silica sol, 263 g. water and 12 g. powdered natural ferrierite. The slurry was heated in a sealed steel reaction vessel for one day at 250°C. The product was found to be ferrierite having the X-ray powder pattern given in Table C. The chemical analysis was as follows:

| | |
|---|---|
| SrO | 4.1% |
| $Li_2O$ | 2.3% |
| $K_2O$ | 0.2% |
| $Al_2O_3$ | 14.5% |
| $SiO_2$ | 78.9% |

EXAMPLE 20

A slurry of the oxide ratio $Li_2O$:$Al_2O_3$:10$SiO_2$:125 $H_2O$ was prepared by mixing 12 g. powdered natural ferrierite, 32.5 g. $LiOH.H_2O$, 150 g. alumina sol, 449 g. silica sol and 302 g. water. The slurry was heated in a sealed steel reaction vessel at 250°C for one day. The product was ferrierite and had the following chemical analysis:

| | |
|---|---|
| $Li_2O$ | 5.4% |
| $K_2O$ | 0.2% |
| $Al_2O_3$ | 13.4% |
| $SiO_2$ | 81.0% |

EXAMPLE 21

A slurry was prepared by the same procedure as in Example 21 to achieve the oxide ratio $Li_2O$:$Al_2O_3$:10 $SiO_2$: 125 $H_2O$. The slurry was reacted in a sealed steel reaction vessel at 225°C for 1 day. The product was found to be ferrierite with the X-ray powder pattern as given in Table C.

The chemical analysis was as follows:

| | |
|---|---|
| $Li_2O$ | 5.3% |
| $K_2O$ | 0.2% |
| $Al_2O_3$ | 15.5% |
| $SiO_2$ | 79.0% |

EXAMPLE 22

A slurry of the oxide ratio $Li_2O$:$Al_2O_3$:10 $SiO_2$:125 $H_2O$ was prepared using the same ingredients as in Example 21. The slurry was reacted in a sealed steel reaction vessel at 200°C. A good yield of ferrierite was obtained in 5 days.

EXAMPLE 23

A slurry was prepared from 17 g. −325 mesh powdered natural ferrierite, 11 g. NaOH, 34.7 g. $LiOH.H_2O$, 209 g. alumina sol, 636 g. silica sol and 437 g. $H_2O$. The slurry oxide ratio was 0.75 $Li_2O$: 0.25 $Na_2O$: $Al_2O_3$: 10 $SiO_2$: 125 $H_2O$. The slurry was sealed into a steel reaction vessel, and the vessel heated at 225°C for one day. The crystallized product was found to be good quality ferrierite. The chemical analysis was as follows:

| | |
|---|---|
| $Li_2O$ | 3.6% |
| $Na_2O$ | 2.5% |
| $K_2O$ | 0.2% |
| $Al_2O_3$ | 14.8% |
| $SiO_2$ | 78.9% |

EXAMPLE 24

A slurry of the oxide ratio 0.75 SrO: 0.45 $K_2O$: 0.53 $Na_2O$: $Al_2O_3$: 10 $SiO_2$: 100 $H_2O$ was obtained by blending 9 g. −325 mesh powdered natural ferrierite, 58 g. $Sr(OH)_2.8 H_2O$, 230 g. −325 mesh pumice and 479 g. water. The slurry was placed in a sealed steel reaction vessel and heated at 300°C for one day. The product was found to be ferrierite, and the X-ray powder pattern is given in Table C. The chemical analysis was as follows:

| | |
|---|---|
| SrO | 6.4% |
| $Na_2O$ | 3.1% |
| $K_2O$ | 5.0% |
| CaO | 1.0% |
| $Fe_2O_3$ | 1.3% |
| MgO | 0.1% |
| $Al_2O_3$ | 13.4% |
| $SiO_2$ | 69.7% |

EXAMPLE 25

The same slurry as in Example 24 was made, except only 39 g. $Sr(OH)_2.8 H_2O$ was used, yielding a slurry ratio of 0.5 SrO: 0.45 $K_2O$: 0.53 $Na_2O$: $Al_2O_3$: 10 $SiO_2$: 100 $H_2O$. After one day of heating the slurry in a sealed steel reaction vessel at 300°C, a good yield of ferrierite was obtained.

The chemical analysis was:

| | |
|---|---|
| SrO | 3.8% |
| $Na_2O$ | 3.1% |
| $K_2O$ | 4.9% |
| CaO | 0.7% |
| $Fe_2O_3$ | 1.0% |
| MgO | 0.1% |
| $Al_2O_3$ | 14.1% |

-continued

SiO₂    72.3%

Examples 24 and 25 show that an inexpensive, natural material, pumice, can supply both the alumina and the silica, other than that supplied by the seeds, to achieve the synthesis of ferrierite.

EXAMPLE 26

Strontium ferrierite was prepared by the procedure described in Example 1. Then 10 g. of the strontium ferrierite were boiled with 100 ml. of 3% hydrochloric acid (1N) for one hour. After this treatment the nitrogen surface area was 242 m²/g, and the X-ray powder pattern showed no evidence of degradation.

The treated ferrierite was then boiled a second time in 1 N hydrochloric acid for one hour. Afterwards, the surface area was 264 m²/g, and the X-ray powder pattern was still very good.

This demonstrates that synthetic ferrierite is a very acid resistant zeolite.

EXAMPLE 27

A volcanic ash from a deposit near Lovelock, Nevada, had the composition:

| | |
|---|---|
| SiO₂ | 74.81% |
| Al₂O₃ | 13.81% |
| Na₂O | 1.80% |
| K₂O | 5.23% |
| MgO | 1.00% |

-continued

| | |
|---|---|
| CaO | 1.52% |
| Fe₂O₃ | 1.61% |
| TiO₂ | 0.27% |

Twenty grams were reacted with 40 g. water at 300°C in a closed steel vessel. After 14 days the product was largely ferrierite with traces of mordenite impurity.

What is claimed is:

1. A process for preparing synthetic ferrierite which comprises the steps of
   a. preparing a reactant mixture having the following oxide molar ratios of reactants 0.75 to 1.5 Li₂O:0.9 to 1.2 Al₂O₃:7 to 20 SiO₂:50 to 600 H₂O,
   b. adding powdered natural or synthetic ferrierite in a concentration of about 0.1 to 10% to the reaction miture,
   c. heating the reactant mixture to about 180° to 325°C. in a closed reaction vessel at a pressure of 1 to 119 atmospheres,
   d. washing, drying and recovering a ferrierite product having the X-ray diffraction pattern essentially as shown in Table C.

2. The process according to claim 1, in which alumina hydrate is the source of alumina.

3. The process according to claim 1, in which silica gel powder is the source of silica.

4. The process according to claim 1, in which natural amorphous aluminosilicates, supply both silica and alumina.

* * * * *